(12) United States Patent
Bloch

(10) Patent No.: US 10,701,259 B2
(45) Date of Patent: Jun. 30, 2020

(54) VIDEO MEASURING SYSTEM WITH DUAL-ACTING RETICLE PROJECTOR FOR FOCUSING AND ALIGNMENT

(71) Applicant: Quality Vision International, Inc., Rochester, NY (US)

(72) Inventor: Stephanie M. Bloch, Penfield, NY (US)

(73) Assignee: QUALITY VISION INTERNATIONAL INC., Rochester, NY (US)

( * ) Notice: Subject to any disclaimer, the term of this patent is extended or adjusted under 35 U.S.C. 154(b) by 266 days.

(21) Appl. No.: 15/705,632

(22) Filed: Sep. 15, 2017

(65) Prior Publication Data

US 2019/0089890 A1 Mar. 21, 2019

(51) Int. Cl.
| | | |
|---|---|---|
| H04N 5/232 | (2006.01) |
| G06T 7/00 | (2017.01) |
| G02B 27/34 | (2006.01) |
| G02B 27/30 | (2006.01) |
| G02B 27/14 | (2006.01) |
| G02B 26/08 | (2006.01) |
| H04N 5/225 | (2006.01) |

(52) U.S. Cl.
CPC ..... *H04N 5/23212* (2013.01); *G02B 26/0816* (2013.01); *G02B 27/141* (2013.01); *G02B 27/30* (2013.01); *G02B 27/34* (2013.01); *G06T 7/0002* (2013.01); *H04N 5/2251* (2013.01); *H04N 5/2258* (2013.01); *H04N 5/23245* (2013.01); *H04N 5/23296* (2013.01)

(58) Field of Classification Search
CPC ........................ H04N 5/23212; G02B 26/0816
See application file for complete search history.

(56) References Cited

U.S. PATENT DOCUMENTS

| 4,743,771 A | 5/1988 | Sacks |
| 5,389,774 A | 2/1995 | Gelman |
| 5,493,400 A | 2/1996 | Gröbler et al. |
| 5,523,583 A | 6/1996 | Choate |

(Continued)

FOREIGN PATENT DOCUMENTS

| JP | 8-136812 A | 5/1996 |
| JP | 9-304682 A | 11/1997 |

OTHER PUBLICATIONS

International Search Report and Written Opinion for Patent Application PCT/US2018/050141 dated Jan. 8, 2019.

*Primary Examiner* — William C Vaughn, Jr.
*Assistant Examiner* — Jerry T Jean Baptiste
(74) *Attorney, Agent, or Firm* — Thomas B. Ryan; Jodi A. Reynolds, Esq.; Harter Secrest & Emery LLP

(57) ABSTRACT

A video measurement system includes an imaging system, a reticle projector for projecting an image of a reticle through the imaging system onto the test object, and a camera for capturing images of the test object together with the reticle image projected onto the test object through the imaging system. A selective reflector reflects the reticle image into the camera from a position along the imaging system in advance of the test object. A mode selector is operable in a first mode for directing the reticle image to the test object and from the test object to the camera and is operable in a second mode for directing the reticle image to the selective reflector and from the selective reflector to the camera.

26 Claims, 2 Drawing Sheets

(56) References Cited

U.S. PATENT DOCUMENTS

Figure 1:
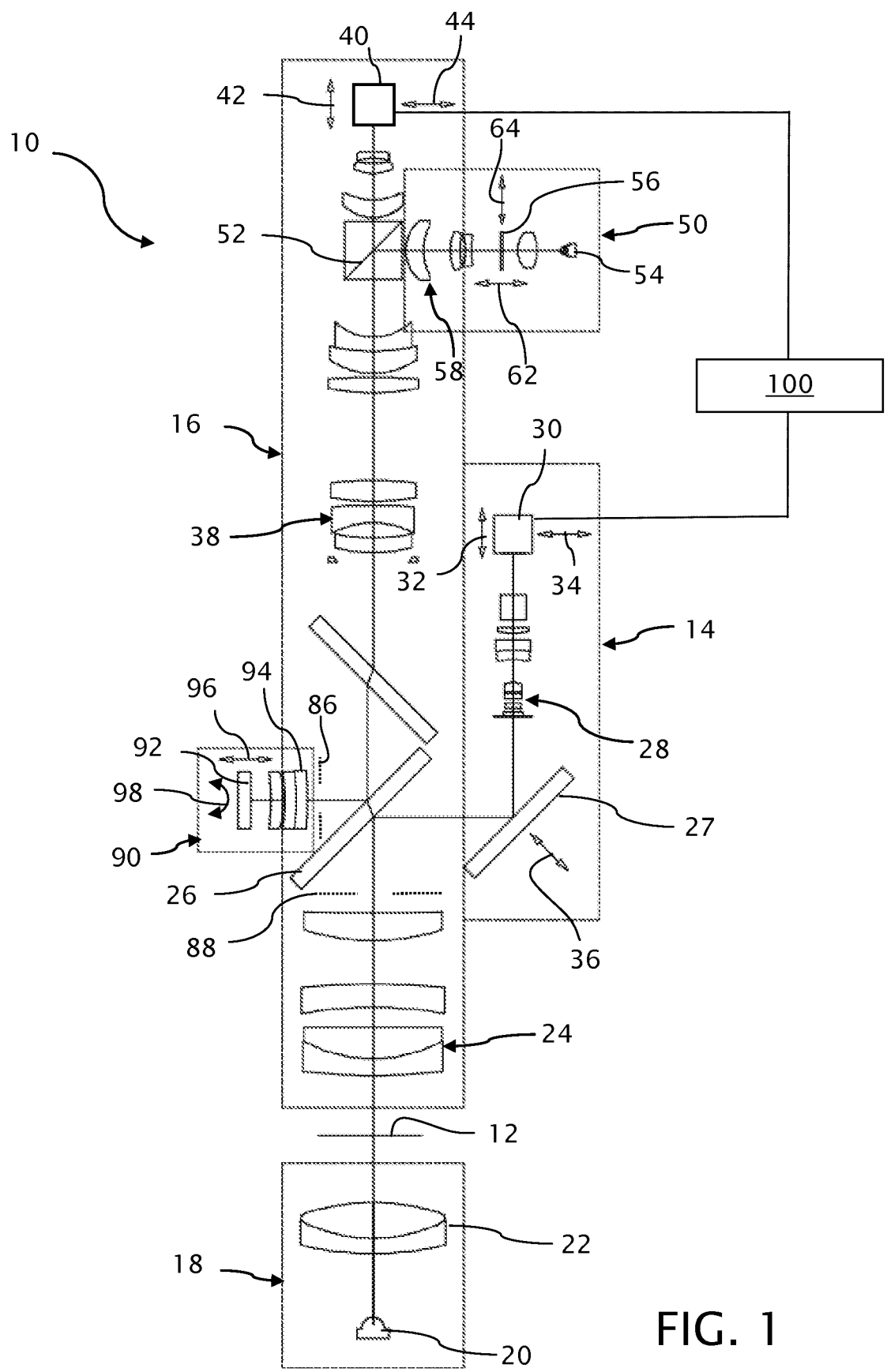

| | | | |
|---|---|---|---|
| 5,619,031 A | 4/1997 | Choate | |
| 5,832,107 A | 11/1998 | Choate | |
| 6,362,882 B1 | 3/2002 | Choate | |
| 8,076,624 B1 * | 12/2011 | Barchers | F41H 13/005 250/201.9 |
| 2004/0017547 A1 * | 1/2004 | Kamm | G03B 17/54 353/28 |
| 2005/0237506 A1 * | 10/2005 | Reisinger | G03B 27/52 355/55 |
| 2012/0194672 A1 | 8/2012 | Kawa | |
| 2016/0223319 A1 * | 8/2016 | Munro | G01B 11/2518 |
| 2017/0302856 A1 * | 10/2017 | Noguchi | H04N 5/2258 |

* cited by examiner

VIDEO MEASURING SYSTEM WITH DUAL-ACTING RETICLE PROJECTOR FOR FOCUSING AND ALIGNMENT

TECHNICAL FIELD

The invention relates to video measuring machines for capturing and processing images of test objects, and in particular, to systems for focusing and calibrating such measuring machines.

BACKGROUND OF THE INVENTION

Video measuring machines are often required to measure test objects having features of different heights, including at different magnifications, which can require adjustments to capture images in proper focus. Although many such machines include telecentric imaging systems for avoiding variations in magnification through a depth of focus, adjustments are often required to maintain the test object or features of the test object at a best or at least acceptable focus position of the telecentric imaging systems for taking accurate measurements.

Focusing can be accomplished in a variety of ways including by relatively moving all or a portion of the imaging system with respect to the test object. Identifying suitable focusing positions can also be accomplished in a variety of ways, including by taking one of more measurements of image contrast within the captured images. For example, image contrast can be assessed by measures of intensity variations or energy content of higher spatial frequencies.

However, the surfaces of some test objects can be either poorly reflective or even too specular, which can diminish contrast variations within the captured images and thereby diminish the accuracy with which focus adjustments relying on contrast variations can be made. To overcome this type of obstacle, grid projectors have been added to video measuring machines for projecting a reticle grid onto the test objects. The projected grid, which can be readily imaged within the camera, provides the required contrast variation necessary for making proper focus adjustments.

Known video measuring machines can be arranged with a variety of illumination systems, including coaxial or through-the-lens illumination systems, oblique illumination systems, and backlighting illumination systems. Although LED (light emitting diode) and other efficient lighting sources can be used, a large amount of energy is sometimes required to achieve the proper level of illumination, which can heat the imaging system optics or their supports. Material expansions caused by heat, as well as adjustments between different settings, such as different magnifications, can affect optical system alignments and other machine calibration issues.

For purposes of monitoring and correcting such misalignments and related calibration issues, another type of grid projector has been used to project a grid through at least a portion of the imaging system onto the camera's image plane detector. The grid includes centering features, such as concentric circles, which can be used for monitoring image position and size on the camera detector.

The additional apparatus for projecting different grids in opposite directions through the imaging system adds cost, complexity and bulk to the imaging systems.

SUMMARY OF THE INVENTION

In one or more embodiments, a single projector of a video measuring machine projects a reticle image through an imaging system onto the surface of a test object as a part of a first mode of operation and projects the same or a different reticle image through a portion of the same imaging system to a reflector that reflects the reticle image back through the same portion of the imaging system onto a camera detector in a second mode of operation. As a further part of the first mode of operation, the reticle image as projected onto the surface of the test part is imaged by the imaging system onto the camera detector. The two modes of operation with overlapping optical paths simplify and relate the functions of focusing and calibration to assure the proper functioning of the video measuring machine.

A video measurement system in accordance with one or more embodiments includes an imaging system, a reticle projector for projecting an image of a reticle through the imaging system onto the test object, and a camera for capturing images of the test object together with the reticle image projected onto the test object through the imaging system. A selective reflector reflects the reticle image into the camera from a position along the imaging system in advance of the test object. A mode selector is operable in a first mode for directing the reticle image to the test object and from the test object to the camera and is operable in a second mode for directing the reticle image to the selective reflector and from the selective reflector to the camera.

The mode selector can include arranging the reticle projector for selectively illuminating the reticle with first and second types of light respectively associated with the first and second modes and arranging the selective reflector for directing only the second of the two types of light to the camera. For example, the selective reflector can exhibit beamsplitting properties for transmitting the first of the two types of light through the selective reflector and for reflecting the second of the two types of light from the selective reflector toward the camera.

The reticle projector can include an illuminator that emits the first type of light distinguished by a first wavelength band and emits the second type of light distinguished by a second different wavelength band. In this regard, the selective reflector can includes a dichroic beamsplitter or a mirror together with a chromatic filter that blocks the first type of light.

Alternatively, the selective reflector can include a mirror and a shutter that is arranged to be open in the second mode for supporting reflections of the second type of light for directing the reticle image from the selective reflector to the camera and is arranged to be closed in the first mode for blocking reflections of the first type of light from the selective reflector to the camera.

A computer processing unit for interpreting images of the reticle captured by the camera for measuring image contrast and image alignment within the camera. The reticle can include a first pattern that is effective in the first mode for measuring image contrast and a second different pattern that is effective in the second mode for measuring image alignment within the camera.

A first beamsplitter can be used to direct the reticle image into the selective reflector from the imaging system and from the selective reflector back into the imaging system. A second beamsplitter can be used to direct the reticle image from the reticle projector into the imaging system and to direct an image of the test object from the imaging system to the camera. The first beamsplitter can also be used to direct the reticle image to the test object and from the test object toward the camera.

Another video measurement system in accordance with one or more embodiments includes a first-magnification imaging system with a first-magnification camera and a second-magnification imaging system with a second-magnification camera. The first-magnification imaging system operates at a different magnification from the second-magnification system. A common objective lens collects light illuminating the test object for both the first magnification imaging system and the second-magnification imaging system. A first beamsplitter directs the light collected by the common objective lens into both the first-magnification imaging system and the second-magnification imaging system. A reticle projector projects an image of a reticle into the second-magnification imaging system. A second beamsplitter directs the light from the reticle projector into the second-magnification imaging system and directs the light within the second-magnification imaging system to the second-magnification camera. A selective reflector reflects the reticle image through the first beamsplitter into both the first-magnification imaging system and the second-magnification imaging system. A mode selector is operable in a first mode for directing the reticle image to the test object and from the test object to the first-magnification camera and the second-magnification camera and is operable in a second mode for directing the reticle image to the selective reflector and from the selective reflector to the first-magnification camera and the second-magnification camera.

The mode selector can include arranging the reticle projector for selectively illuminating the reticle with first and second types of light respectively associated with the first and second modes and arranging the selective reflector for directing only the second of the two types of light to the first-magnification camera and the second-magnification camera.

BRIEF DESCRIPTION OF THE DRAWING FIGURES

Figure 2:
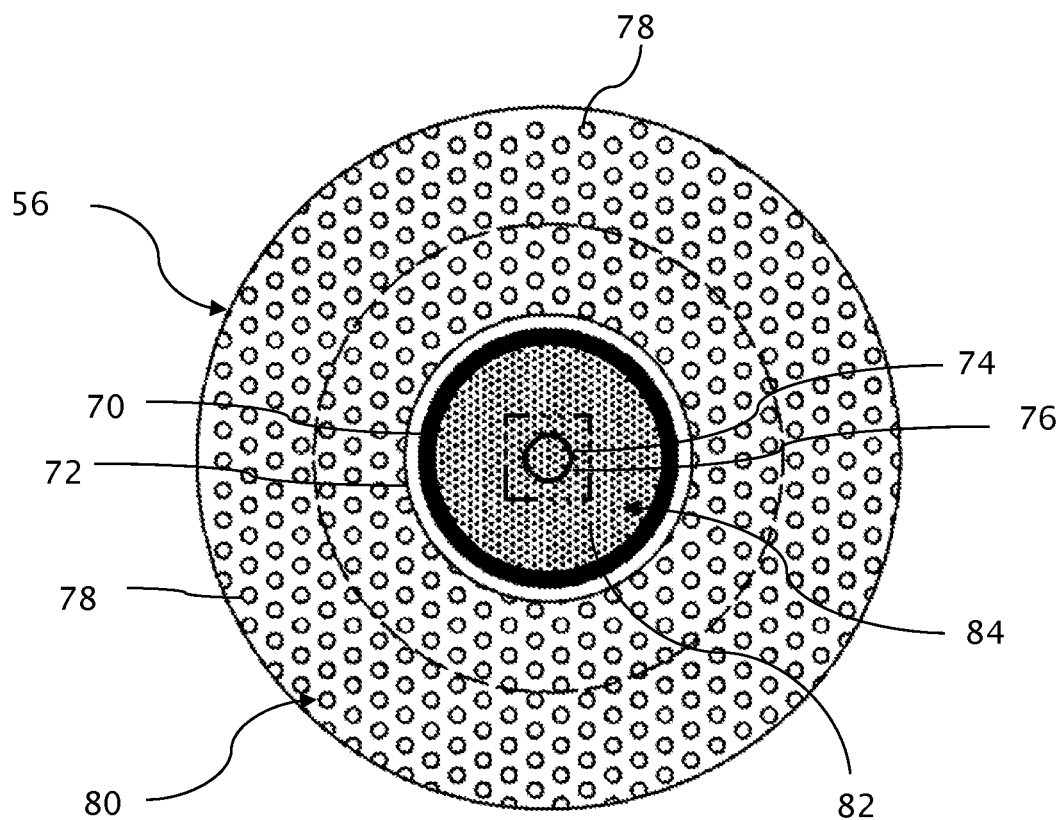
Figure 3:
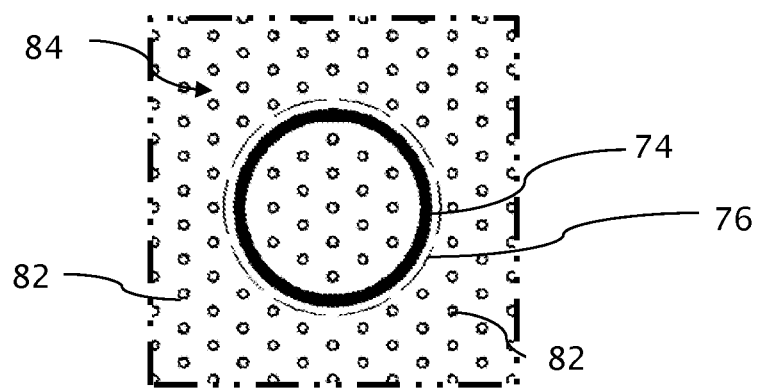

FIG. 1 is a schematic layout of a dual magnification system with a dual purpose reticle projector.
FIG. 2 is a plan view of a reticle for the dual purpose use.
FIG. 3 is an enlarged broken-away central portion of the reticle.

DETAILED DESCRIPTION OF THE INVENTION

A dual magnification video magnification system 10 as shown in FIG. 1 provides for simultaneously or sequentially measuring a test object 12 with both a low-magnification imaging system 14 and a high-magnification imaging system 16. The test object 12 can be illuminated by a conventional illumination system, which is depicted in FIG. 1 as a backlighting system 18, but could also be arranged as a coaxial or through-the-lens illumination system or as an oblique illumination system. Here, the backlighting system includes a light source 20 and a collimating lens 22.

A common objective lens 24 collects light illuminating the test object 12 for both the low-magnification imaging system 14 and the high-magnification imaging system 16. A beamsplitter 26 directs the collected light into both the low-magnification imaging system 14 and the high-magnification imaging system 16. A portion of the collected light is reflected by the beamsplitter 26 into the low-magnification imaging system 14, and another portion of the collected light is transmitted through the beamsplitter 26 into the high-magnification imaging system 16. The low-magnification imaging system 14 includes a fold mirror 27, low-magnification optics 28, and a low-magnification camera 30 that is adjustable both along its optical axis (Z) and in a transverse image plane (X-Y) by separately controllable actuators indicated schematically by arrows 32 and 34. The fold mirror 27 is adjustable normal to its reflective surface by an actuator 36 schematically indicated by arrow 36 to adjust for low-magnification drift. The high-magnification imaging system 16 includes high-magnification optics 38 and a high-magnification camera 40 that is adjustable both along its optical axis (Z) and in a transverse image plane (X-Y) by separately controllable actuators indicated schematically by arrows 42 and 44. The low-magnification and high-magnification cameras 30 and 40 include a detector for capturing images, such as CCD (charge-coupled device) or CMOS (complementary metal-oxide-semiconductor) image sensors.

For the purposes of both measuring the height of test object features that exhibit low contrast and calibrating the captured video images of the low-magnification imaging system 14 and the high-magnification imaging system 16, a reticle projector 50 is optically coupled into the high-magnification imaging system 16 through a beamsplitter 52. The reticle projector 50 includes an illuminator 54, a reticle 56, and projection optics 58, which can be arranged for locating the reticle 56 at least approximately conjugate to the high-magnification camera 40. The illuminator 54, which can function as a part of a mode selector, can comprise two different color light sources (e.g., green and red LEDs) or a broad band source can be combined with different color filters. The different types of light are associated with different operating modes. The reticle 56 is adjustable both along its optical axis (Z) and in a transverse plane (X-Y) by separately controllable actuators indicated schematically by arrows 62 and 64. The beamsplitter 52, which is shown as a cubic beamsplitter, transmits light collected from the test object 12 toward the high-magnification camera 40 and reflects light from the reticle projector 50 toward the test object 12.

One example of the referenced reticle 56 is depicted in FIG. 2 and the enlarged break-away view of FIG. 3. The depicted reticle 56 includes a median ring 70 (shown as a dark circle) surrounded by a clearance ring 72, whose combined projection allows for centering and determining the magnification of the low-magnification imaging system 14 within the camera 30. Similarly, depicted reticle 56 includes a smaller concentric inner ring 74 (shown as a dark circle) surrounded by a clearance ring 76, whose combined projection allows for centering and determining the magnification of the high-magnification imaging system 16 within the camera 40. Beyond the median ring 70 and clearance ring 72, a pattern of small annuli 78 are arranged in a hexagonal grid pattern 80. The small annuli 78 as projected onto the surface of the test object 12 have surrounding edges in all directions from which contrast measurements can be made across the image plane of the low-magnification imaging system 14. Within the median ring 70 and on both sides of the smaller inner ring 74 and clearance ring 76, even smaller annuli 82 in a finer hexagonal pattern 84 provide for similarly making enhanced contrast measurements across the image plane of the high-magnification imaging system 16.

In a first mode of operation for enhancing height measurements of the test object 12, the reticle 56 can be illuminated by the illuminator 54 with a first type of light, e.g., light within a given wavelength band such as green light, and an image of the illuminated reticle 56 can be relayed through the high-magnification imaging system 16 and the common objective lens 24 to the test object 12. The beamsplitter 52 reflects the projected light into the high-magnification imaging system 16 and the beamsplitter 26 transmits the projected light into the common objective lens 24. The relayed image of the reticle 56 onto the surface of the test object 12 creates a pattern of artificial contrast following the contours of the test object surface. Thus, the test object 12 functions as a projector screen with an irregular surface that is more readily visible to both the low-magnification imaging system 14 and the high-magnification imaging system 16 than a conventionally illuminated surface of the test object 12. The low-magnification imaging system 14 images the test object 12 together with the projected reticle pattern 80 on its surface to the low-magnification camera 30, and the high-magnification imaging system 16 images the test object 12 together with the projected reticle pattern 84 on its surface over a smaller field of view to the high-magnification camera 40.

Similar to a conventional video measurement system operating at different magnifications, the low-magnification imaging system 14 provides both a large field of view and a large depth of view for identifying the type and location of one or more test objects 12 presented for measurement, e.g., one or more test objects 12 mounted on a translatable motion stage of the video measurement system 10. In addition, the low-magnification imaging system 14 can provide video measurements of a range of test object feature sizes with a given range of accuracy, particularly for measuring the size and relative location of features within the captured image plane. The high-magnification imaging system 16, which operates over both a smaller field of view and a smaller depth of view, measures smaller test object features as well as height variations in the surfaces of test objects, such as by exploiting autofocus methods in which surface height is equated to best focus positions. The image of the reticle 56 captured, for example, by the high-magnification camera 40 as an illumination pattern 84 on the surface of the test object 12 allows for more precise determinations of the best focus positions at different points on the surface of the test object 12 where maximum contrast is apparent. The measurements can be made by relatively translating the optical assembly with respect to the test object 12 to identify the best focus positions and measuring the translations such as by using a linear encoder or other distance measuring device. Autofocus measurements can also be made by translating the high-magnification camera 40 along the optical axis (Z) and similarly measuring the camera displacements, such as by incorporating a potentiometer within a piezoelectric stage for the camera mount or other distance measuring device. For achieving better repeatability and accuracy, the f/number of the high-magnification camera 40 (e.g., f/2.5) is preferably lower than the f/number at the object plane (e.g., f/5.0). For purposes of higher accuracy and repeatability, the high-magnification camera 40 can be returned to its nominal position before making each measurement. However, measurements with the high-magnification camera 40 can be taken in sequence without returning to the nominal position when shorter measurement times are deemed of more importance.

In a second mode of operation for monitoring and calibrating alignments between the low-magnification imaging system 14 and the high-magnification imaging system 16, the reticle 56 can be illuminated by the illuminator 54 with a second type of light, e.g., light within a different wavelength band such as red light. An image of the differently illuminated reticle 56 is relayed through the high-magnification imaging system 16 and is reflected by the beamsplitter 26 into a selective reflector 90 that is sensitive to type of illumination emitted by the illuminator 54, and as such, can also be considered as a part of the mode selector. The selective reflector 90 includes a beamsplitting mirror 92, such as a dichroic mirror, and optics 94 that further relay the image of the reticle 56. The beamsplitting mirror 92 transmits the first type of light emitted by the illuminator 54, which light can be discarded if not otherwise used, and reflects the second type of light back to the beamsplitter 26. Thus, any of the first type of light reflected by the beamsplitter 26 into the selective reflector 90 can be discarded, and only the second type of light is returned to the beamsplitter 26. A first portion of the returning second type of light is transmitted through the beamsplitter 26 into the low-magnification imaging system 14 for imaging the reticle 56 onto the low-magnification camera 30. A second portion of the returning second type of light is reflected by the beamsplitter 26 into the high-magnification imaging system 16 for imaging the reticle 56 onto the high-magnification camera 40. The objective lens 24 can include a chromatic filter to prevent light of the second type from reaching the test object 12. Similarly, in place of a beamsplitting mirror 92 for discarding the first type of light from the selective reflector 90, a conventional mirror could be combined with a chromatic filter to exclude propagation of the first type of light from the selective reflector 90. Alternatively, a conventional mirror could be combined within the selective reflector 90 with a shutter 86 that can be closed when the first type of light is emitted from the reticle projector 50 for measuring the test object 12 and that can be opened when the second type of light is emitted from the reticle projector 50 for measuring optical relationships within the low-magnification imaging system 14 and the high-magnification imaging system 16. Another shutter 88 could be used to block the passage of the second type of light from reaching the objective lens 24 or returning through the objective lens 24 to the beamsplitter 26.

The optics 94 together with an axial actuator 96 in the form of an axial position adjuster contribute to positioning the reticle 56 conjugate to both the low-magnification camera 30 and the high-magnification camera 40 along an optical pathway subject to reflection from the beamsplitting mirror 92. The reflected reticle 56 in the second type of light can be used to calibrate, measure, and monitor changes between the low-magnification imaging system 14 and the high-magnification imaging system 16.

During an initial calibration, the projected pattern of the reticle 56 can be centered within both the low-magnification camera 30 and the high-magnification camera 40. For this purpose, the reticle 56 as shown in FIG. 2 can include both the median ring 70 surrounded by the clearance ring 72 and the concentrically disposed inner ring 74 surrounded by the clearance ring 76, each having respective diameters of known dimensions. The median ring 70, for example, can have a diameter that will appear in proper size in the low-magnification camera 30 at a given magnification of the low-magnification imaging system 14, and the smaller inner ring 74, for example, can have a diameter that will appear in proper size in the high-magnification camera 40 at a given magnification of the high-magnification imaging system 16. In addition, the apparent center points of the projected annuli 78 and 82 in the image plane can be recorded by the cameras 30 and 40 for measuring the respective magnifications and orientations throughout their fields of view. The axial actuator 62 of the reticle projector 50, the axial actuator 96 of the selective reflector 90 can be adjusted together with one or both of the axial actuators 32 and 42 for focusing the projected pattern of the reticle 56 in the second type of light at given magnifications onto both the low-magnification camera 30 and the high-magnification camera 40. This position of the reticle 56 can be used to establish a so-called "home" position against which subsequent height adjustments can be measured. Similarly, the transverse actuator 64 of the reticle projector 50 can be adjusted together with one or both of the transverse actuators 34 and 44 for centering the projected pattern of the reticle 56 in the second type of light within both the low-magnification camera 30 and the high-magnification camera 40.

Changes within and between the low-magnification imaging system 14 and the high-magnification imaging system 14 accompanying use of the video measurement system 10 can be monitored by periodically projecting the reticle 56 in the second type of light into both the low-magnification camera 30 and the high-magnification camera 40. Measures of any changes in the projected patterns can be used to recalibrate or numerically compensate for the changes to provide a convenient and repeatable baseline for measuring the test object 12 in a coordinated manner with both the low-magnification imaging system 14 and the high-magnification imaging system 16.

A computer 100 can be connected to both the low-magnification camera 30 and the high-magnification camera 40 to process captured video images including images of the reticle 56 that are produced by the two types of light emitted from the reticle projector 50. For example, the computer 100 can be arranged for interpreting images of the reticle 56 captured by the cameras 30 and 40 for measuring image contrast, image size, and image alignment within the cameras 30 and 40. Any of the various actuators, including the actuators 32 and 34, 42 and 44, 62 and 64, and 96, and particularly actuators used for autofocus purposes, can be controlled by the computer 100. However, the actuators, particularly the actuators 34, 44, and 64 for making the transverse adjustments, could be manually adjusted for calibration purposes.

Although the reticle projector 50 is described as having an illuminator 54 as a part of a mode selector, a single-color illuminator in combination with controllable shutters 86 and 88 could also be used to provide the different selectable modes of operation. For example, the shutter 86 can be associated with the selective reflector 90 and another shutter 88 can be associated with the objective lens 24. In the first mode of operation, the shutter 86 associated with the selective reflector 90 can be closed to block the conveyance of the reticle image from the selective reflector 90 to the cameras 30 and 40, and the shutter 88 associated with the objective lens 24 can be open for allowing the reticle image to be conveyed to the test object 12 and from the test object 12 to the cameras 30 and 40. In the second mode of operation, the shutter 86 associated with the selective reflector 90 can be open to convey the reticle image to the selective reflector 90 and from the selective reflector 90 to the cameras 30 and 40, and the shutter 88 associated with the objective lens 24 can be closed to block the conveyance of the reticle image from the test object 12 to the cameras 30 and 40.

In place of the shutter 86 or chromatic differentiations, an actuator indicated schematically by arrow 98 can be used to move the mirror 92 into or out of a retroreflective position within the selective reflector 90. For example, the actuator 98 can tilt or translate the mirror 92 out of a position capable of reflecting an image of the reticle 58 to the cameras 30 and 40.

While the reticle 56 is described as a dual purpose reticle having features optimized for both modes of operation, different reticles could be used for the different modes using the same of different illuminators. In addition, while the reticle projector 50 is described as being coupled to the high-magnification imaging system 16, the reticle projector 50 could alternatively be coupled to the low-magnification imaging system 14, particularly if the positions of the two magnification systems were to be reversed with respect to the beamsplitter 26.

The invention claimed is:

1. A video measurement system for measuring a test object comprising:
   an imaging system;
   a reticle projector for projecting an image of a reticle through the imaging system onto the test object;
   a camera for capturing images of the test object together with the reticle image projected onto the test object through the imaging system;
   a selective reflector for reflecting the reticle image into the camera from a position along the imaging system in advance of the test object; and
   a mode selector being operable in a first mode for directing the reticle image to the test object and from the test object to the camera and being operable in a second mode for directing the reticle image to the selective reflector and from the selective reflector to the camera.

2. The video measurement system of claim 1 in which the mode selector includes the reticle projector being arranged for selectively illuminating the reticle with first and second types of light respectively associated with the first and second modes, and the selective reflector being arranged for directing only the second of the two types of light to the camera.

3. The video measurement system of claim 2 in which the selective reflector is associated with beamsplitting properties for transmitting the first of the two types of light through the selective reflector and for reflecting the second of the two types of light from the selective reflector toward the camera.

4. The video measurement system of claim 2 in which the reticle projector includes an illuminator that emits the first type of light distinguished by a first wavelength band and emits the second type of light distinguished by a second different wavelength band.

5. The video measurement system of claim 4 in which the selective reflector includes a dichroic beamsplitter.

6. The video measurement system of claim 4 in which the selective reflector includes a mirror and a chromatic filter that blocks the first type of light.

7. The video measurement system of claim 2 in which the selective reflector includes a mirror and a shutter that is arranged to be open in the second mode for supporting reflections of the second type of light for directing the reticle image from the selective reflector to the camera and is arranged to be closed in the first mode for blocking reflections of the first type of light from the selective reflector to the camera.

8. The video measurement system of claim 1 in which the selective reflector includes a mirror and a shutter that is arranged to be open in the second mode for supporting reflections the reticle image from the selective reflector to the camera and is arranged to be closed in the first mode for blocking reflections of the reticle image from the selective reflector to the camera.

9. The video measurement system of claim 1 in which the selective reflector includes a mirror and an actuator for moving the mirror between a first position for supporting reflections the reticle image from the selective reflector to the camera and a second position for not supporting reflections of the reticle image from the selective reflector to the camera.

10. The video measurement system of claim 1 in which a position of at least one of the camera and at least a portion the imaging system is adjustable for focusing the reticle pattern on the test object.

11. The video measurement system of claim 1 further comprising a computer processing unit for interpreting images of the reticle captured by the camera for measuring image contrast and image alignment within the camera.

12. The video measurement system of claim 1 in which the reticle includes a first pattern that is effective in the first mode for measuring image contrast and a second different pattern that is effective in the second mode for measuring image alignment within the camera.

13. The video measurement system of claim 1 further comprising a first beamsplitter for directing the reticle image into the selective reflector from the imaging system and from the selective reflector to the imaging system.

14. The video measurement system of claim 13 further comprising a second beamsplitter for directing the reticle image from the reticle projector into the imaging system and for directing an image of the test object from the imaging system to the camera.

15. The video measurement system of claim 14 in which the first beamsplitter directs the reticle image to the test object and from the test object toward the camera.

16. A video measurement system for measuring a test object comprising:
 a first-magnification imaging system including a first-magnification camera;
 a second-magnification imaging system including a second-magnification camera, wherein the first-magnification imaging system operates at a different magnification from the second-magnification system;
 a common objective lens that collects light illuminating the test object for both the first magnification imaging system and the second-magnification imaging system;
 a first beamsplitter that directs the light collected by the common objective lens into both the first-magnification imaging system and the second-magnification imaging system;
 a reticle projector for projecting an image of a reticle into the second-magnification imaging system;
 a second beamsplitter that directs the light from the reticle projector into the second-magnification imaging system and directs the light within the second-magnification imaging system to the second-magnification camera;
 a selective reflector that reflects the reticle image through the first beamsplitter into both the first-magnification imaging system and the second-magnification imaging system; and
 a mode selector being operable in a first mode for directing the reticle image to the test object and from the test object to the first-magnification camera and the second-magnification camera, and being operable in a second mode for directing the reticle image to the selective reflector and from the selective reflector to the first-magnification camera and the second-magnification camera.

17. The video measurement system of claim 16 in which the mode selector includes the reticle projector being arranged for selectively illuminating the reticle with first and second types of light respectively associated with the first and second modes, and the selective reflector being arranged for directing only the second of the two types of light to the first-magnification camera and the second-magnification camera.

18. The video measurement system of claim 17 in which the selective reflector is associated with beamsplitting properties for transmitting the first of the two types of light through the selective reflector and for reflecting the second of the two types of light from the selective reflector toward the first-magnification camera and the second-magnification camera.

19. The video measurement system of claim 17 in which the reticle projector includes an illuminator that emits the first type of light distinguished by a first wavelength band and emits the second type of light distinguished by a second different wavelength band.

20. The video measurement system of claim 19 in which the selective reflector includes a dichroic beamsplitter.

21. The video measurement system of claim 19 in which the selective reflector includes a mirror and a chromatic filter that blocks the first type of light.

22. The video measurement system of claim 17 in which the selective reflector includes a mirror and a shutter that is arranged to be open in the second mode for supporting reflections of the second type of light for directing the reticle image from the selective reflector to the first-magnification camera and the second-magnification camera and is arranged to be closed in the first mode for blocking reflections of the first type of light from the selective reflector to the first-magnification camera and the second-magnification camera.

23. The video measurement system of claim 16 in which the selective reflector includes a mirror and a shutter that is arranged to be open in the second mode for supporting reflections the reticle image from the selective reflector to the first-magnification camera and the second-magnification camera and is arranged to be closed in the first mode for blocking reflections of the reticle image from the selective reflector to the first-magnification camera and the second-magnification camera.

24. The video measurement system of claim 16 in which the selective reflector includes a mirror and an actuator for moving the mirror between a first position for supporting reflections the reticle image from the selective reflector to the first-magnification camera and the second-magnification camera and a second position for not supporting reflections of the reticle image from the selective reflector to the first-magnification camera and the second-magnification camera.

25. The video measurement system of claim 16 further comprising a computer processing unit for interpreting images of the reticle captured by the camera for measuring image contrast and image alignment within the camera.

26. The video measurement system of claim 25 in which the reticle includes a first pattern that is effective in the first mode for measuring image contrast and a second different pattern that is effective in the second mode for measuring image alignment within the camera.

* * * * *